(12) United States Patent
Perotti et al.

(10) Patent No.: US 7,274,907 B1
(45) Date of Patent: Sep. 25, 2007

(54) WIRELESS INSTRUMENTATION SYSTEM AND POWER MANAGEMENT SCHEME THEREFORE

(75) Inventors: Jose Perotti, Merritt Island, FL (US); Angel Lucena, Orlando, FL (US); Anthony Eckhoff, Cocoa, FL (US); Carlos T. Mata, Titusville, FL (US); Norman N. Blalock, Rockledge, FL (US); Pedro J. Medelius, Merritt Island, FL (US)

(73) Assignee: Unites States of America as represented by the Administrator of the National Aeronautics and Space Administration, Washington, DC (US)

( * ) Notice: Subject to any disclaimer, the term of this patent is extended or adjusted under 35 U.S.C. 154(b) by 217 days.

(21) Appl. No.: 10/748,915

(22) Filed: Dec. 19, 2003

(51) Int. Cl.
*H04B 7/15* (2006.01)
(52) U.S. Cl. .................... 455/11.1; 455/13.1; 455/13.4; 455/16; 455/7; 455/522; 455/517; 370/328; 370/338; 370/349
(58) Field of Classification Search ................ 455/574, 455/550.1, 11.1, 7, 8, 9, 10, 12.1, 13.1, 13.4, 455/16, 522, 517, 69; 370/274, 279, 293, 370/315, 492, 328, 338, 349
See application file for complete search history.

(56) References Cited

U.S. PATENT DOCUMENTS

| | | | |
|---|---|---|---|
| 4,924,418 A | 5/1990 | Bachman et al. | |
| 6,204,775 B1 | 3/2001 | Kubacsi | |
| 6,208,247 B1 | 3/2001 | Agre et al. | |
| 6,292,108 B1 | 9/2001 | Straser et al. | |
| 6,411,921 B1 | 6/2002 | Schiltz et al. | |
| 6,422,061 B1 | 7/2002 | Sunshine et al. | |
| 6,434,512 B1 | 8/2002 | Discenzo | |
| 7,020,102 B2* | 3/2006 | Tuomainen et al. | 370/311 |
| 7,092,434 B2* | 8/2006 | Moon et al. | 375/211 |
| 2001/0036810 A1* | 11/2001 | Larsen | 455/11.1 |
| 2002/0004694 A1 | 1/2002 | McLeod et al. | |
| 2002/0049564 A1 | 4/2002 | Johansson et al. | |
| 2003/0125067 A1* | 7/2003 | Takeda et al. | 455/522 |
| 2004/0063451 A1* | 4/2004 | Bonta et al. | 455/519 |
| 2004/0233888 A1* | 11/2004 | Bonta et al. | 370/350 |
| 2004/0242154 A1* | 12/2004 | Takeda et al. | 455/16 |
| 2005/0048914 A1* | 3/2005 | Sartori et al. | 455/11.1 |
| 2005/0053025 A1* | 3/2005 | Duffy et al. | 370/315 |
| 2005/0272366 A1* | 12/2005 | Eichinger et al. | 455/9 |

* cited by examiner

*Primary Examiner*—Rafael Perez-Gutierrez
*Assistant Examiner*—Khai Nguyen
(74) *Attorney, Agent, or Firm*—Randall M. Heald; Thomas W. Leffert

(57) ABSTRACT

A wireless instrumentation system enables a plurality of low power wireless transceivers to transmit measurement data from a plurality of remote station sensors to a central data station accurately and reliably. The system employs a relay based communications scheme where remote stations that cannot communicate directly with the central station due to interference, poor signal strength, etc., are instructed to communicate with other of the remote stations that act as relays to the central station. A unique power management scheme is also employed to minimize power usage at each remote station and thereby maximize battery life. Each of the remote stations preferably employs a modular design to facilitate easy reconfiguration of the stations as required.

46 Claims, 7 Drawing Sheets

WIRELESS INSTRUMENTATION SYSTEM AND POWER MANAGEMENT SCHEME THEREFORE

ORIGIN OF THE INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION

1. Field of the Invention

The present invention relates to a wireless instrumentation system that is particularly suited for acquiring measurement data from a number of remote station sensors and transmitting the data to a central station. In the preferred embodiment, the system is designed to operate with low power transceivers and other elements and includes an automatic data relaying scheme for accommodating communications with out-of-range transceivers. In addition, a power management scheme is employed for minimizing power consumption by the remote stations.

2. Description of the Background Art

A number of measurement devices and systems are currently in use around the launch pad and within the Vehicle Assembly Building (VAB) at the Kennedy Space Center (KSC) to monitor various operational parameters of the Space Shuttle and related systems. Most of these systems use cabling to support power and data transmission. In such systems, interaction at the sensor level is not a desirable option because of extensive cabling requirements. Centralized data acquisition systems have therefore been employed, which, unless provided with redundancy, have often been the source of single point failures.

These issues have led to the need for data acquisition system that can operate in close proximity to the Orbiter, External Tank and Solid Rocket Boosters, for example, without interfering with existing electronic systems. To eliminate cabling issues, the system would have to be a wireless radio frequency (RF) system that could be interfaced with various measurement devices and would include a plurality of remote sensor stations in communication with a central station. However, limitations on both power and physical size of the remote stations would be necessary to minimize radio interference with other electronic systems and space requirements. As a result, the remote stations would have to be implemented with low power transceivers that are powered by small exhaustible power sources, e.g. batteries. Very low RF power systems can be operated in close proximity to other systems virtually interference-free. However, low RF power inherently limits the operating range of the transceivers, thus making it difficult or impossible to insure reliable communications between each remote station and the central station. Furthermore, small batteries inherently imply short life which means that a power management scheme would be necessary to maximize energy utilization and battery life of each remote station.

SUMMARY OF THE INVENTION

To address the forgoing needs, the present invention provides a wireless instrumentation system that enables a plurality of low power wireless transceivers to transmit measurement data from a plurality of remote station sensors to a central data collection station accurately and reliably. The system is designed specifically to insure that sensor data can be received from the low power transceivers, even when the transceivers are affected by poor RF signal conditions or no RF signal due to physical placement outside the normal range of the central data collection station. In addition, a unique power management scheme is employed to minimize power usage at each remote station and thereby maximize battery life.

More particularly, the system comprises a plurality of stations, each of which includes a transceiver and a computer-based controller. At least one of the stations is selected to be a central station, while the remaining stations are each designated as a remote station. The station controllers employ a relay-based communications scheme that facilitates communicating with remote stations that are transmitting/receiving either weak or no RF signals to/from the central station. In the scheme, these weak stations are identified and automatically become satellite stations of another remote station that is capable of better communications. In an effort to increase the range of the system communications even further, additional levels are created that permit stations to relay data from one location to another through a number of the remote stations. This permits stations that are too far from the central station location to communicate indirectly with the central station.

In the communications scheme, the central station normally communicates with all of the remote stations using a conventional handshaking routine in which the central station sends a command to each remote station transceiver and then waits for a reply from each transceiver confirming that the command has been received. Mainly because of their low RF power properties, distant stations or those located in signal-poor areas where the communication drop rate is too high, may not be able to communicate consistently, if at all, with the central station. To detect such communication failures, the central station and the remote stations constantly monitor their communication health using a health check routine. The central station controller labels any of the remote stations that cannot be reached as "lost stations." Thus, in the event that the central station fails to receive an acknowledgment reply from anyone of the remote station transceivers, the central station controller identifies that remote station as a lost station and begins a routine that will identify which of the other remote stations has the ability to communicate with the lost station. That remote station is then designated as a relay station to guarantee the communication between the central station and the lost station. The routine can continue on to more levels, effectively creating a chain of stations which relay data from one to another, to permit long-distance communications using relatively low power.

To enable continuous high-speed transmissions and to overcome frequency jamming, each transceiver is preferably capable of sending and receiving data on a plurality of transmit and receive frequencies. This permits multiple communication paths between the central station and the remote stations, and between the remote stations and any lost stations for simultaneous operations without interference. Under normal operations, the central station queries each remote station in the system using a "primary transmit" frequency, while each remote station replies in sequence on a "primary receive" frequency. All remote stations that communicate directly with the central station are designated primary stations. If all stations reply as expected, the central station will eventually cycle through each remote station and restart the process.

In the preferred embodiment, should a primary remote station be identified as a lost station, two things will occur. First, the lost station's controller, in response to not having received a polling command from the central station for a predetermined period of time, will change the transceiver's transmit and receive frequencies to an alternate frequency pair. Second, the central station controller will then begin the routine to find a primary station that has the ability to communicate with the identified lost station. On the next successive poll, the central station transmits data to all primary stations to identify the station that is lost and commands the first primary station in the poll sequence to retransmit a query to the lost station. That primary station controller then switches its transceiver to the alternate frequency pair, transmits a poll, and waits for a response. If the lost station responds, the primary station then stores the data and its controller switches back to the primary frequency pair until the central station polls it again. At this point, the primary station will send both its own data and that of the lost station to the central station using the primary frequency pair. With this response, the central station controller notes the successful communications loop and designates that primary station as the relay station for all future communications with that particular lost station. The central station controller continues to establish a direct communication with the lost station using the primary frequency or any of the alternate frequency pairs even when it has already identified a relay station. This process occurs automatically and autonomously in the system.

To extend the distance capability, it can be possible to place a tertiary station at a distance far enough away from the central and primary stations that it would have to rely on a secondary station as its only source of communications with the system. Such system layouts may be necessary, by design, rather than incidental due to malfunction. The operation sequences mimic that of a normal lost station routine but differ in that the level reaches one step further and utilizes other alternate frequency pairs for transmitting and receiving. Additional alternate frequency pairs could be employed to extend the chain of relay stations even further, though in actual practice, a chain consisting of the central station, a lost remote station and two relay stations between these should be sufficient.

The wireless instrumentation system also preferably employs an effective power management algorithm to achieve maximum data transfer with minimum power consumption. As noted before, the central station acts as a master station that repeatedly sends the commands to the remote stations until a response is received or timeout occurs. To save power, the remote stations remain in a low power consumption mode much of the time, but are powered up periodically to check whether a central station request for action is received. If so, the power management algorithm will maintain the power to the various circuit elements in the remote station until a reply has been transmitted back to the central station. Once this occurs, the algorithm powers the remote station back down until the arrival of the next time interval for checking for incoming commands from the central station. The power on/off duty cycle implemented by the algorithm can be readily adjusted either by the remote station controller itself or by the central station controller to allow for faster or slower communications, depending on the criticality of the particular parameter being monitored.

Preferably, the wireless system also employs a modular architecture in which a wireless core module and a power module are common for every remote station. An analog signal conditioning board is provided that is unique to each sensor. The modular design allows for only the analog board to be replaced if a special measurement must be accommodated, thus simplifying the installation for new measurements by requiring minimal hardware changes. Since the system does not require permanent power and communication cables, it becomes easily portable and reconfigurable. The modular architecture also allows for the inclusion of unique functions in the system. Examples of these functions are additional local data storage, local complex data processing, etc.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE PREFERRED EMBODIMENT

Figure 1:
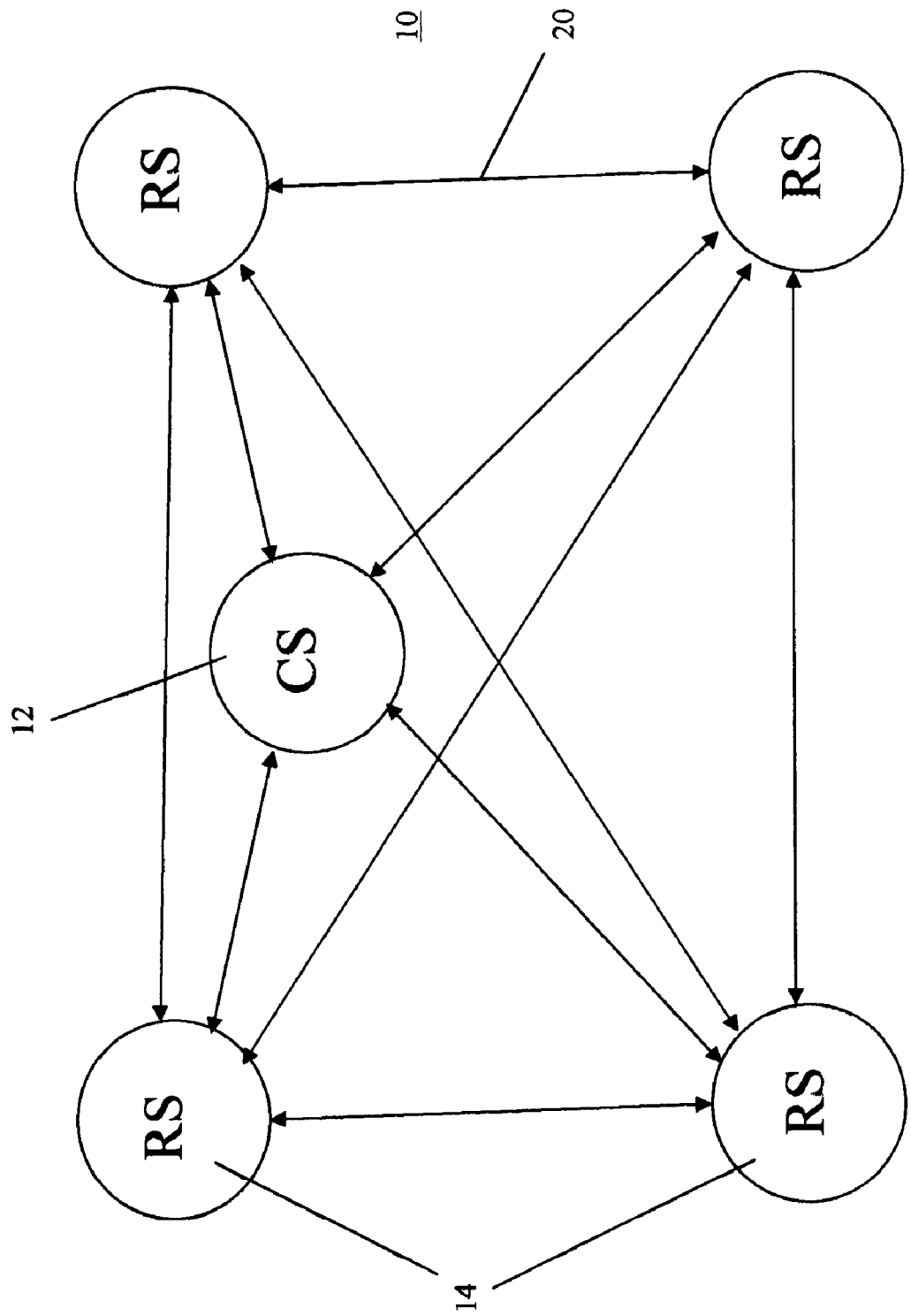
FIG. 1 is a block diagram of a wireless instrumentation system that is constructed in accordance with a preferred embodiment of the present invention.
Figure 2:
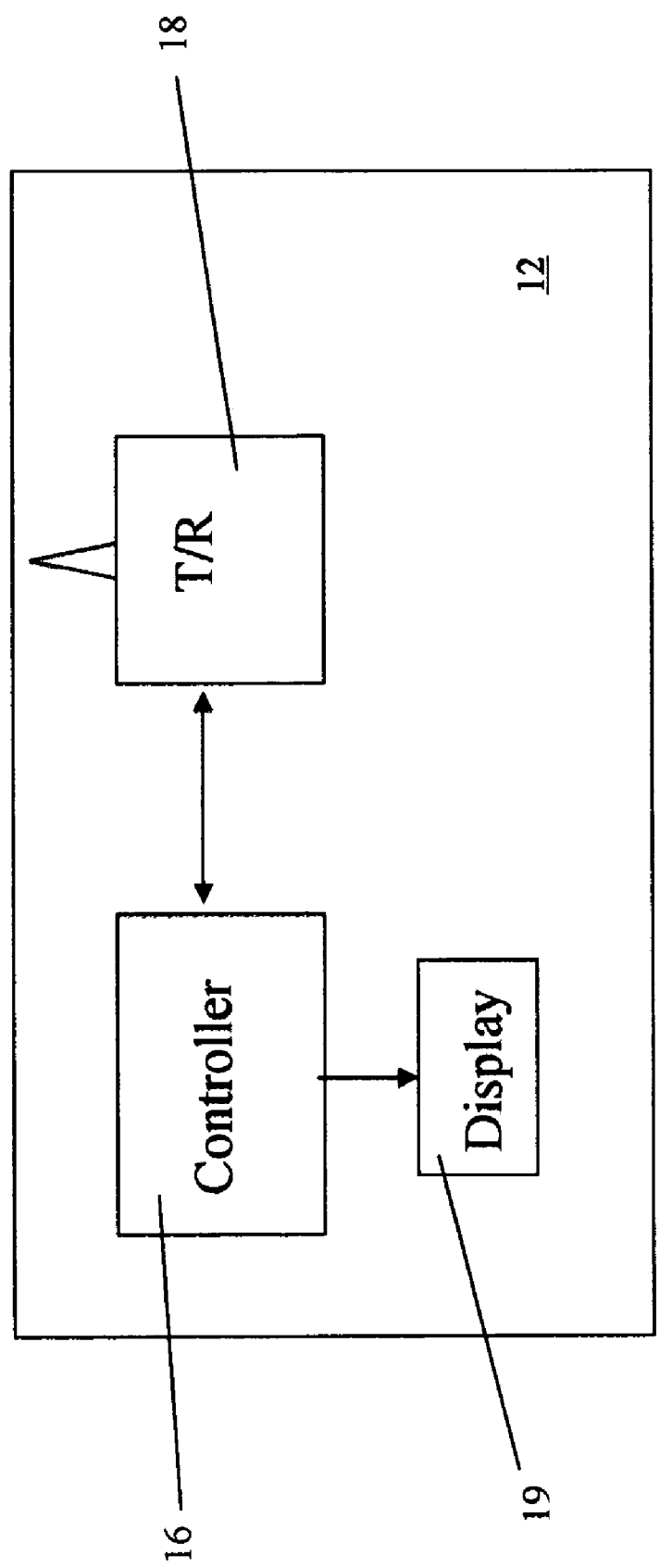
FIG. 2 is a block diagram of a central communications station for the wireless system of FIG. 1.

With reference to FIGS. 1 and 2, a wireless instrumentation system 10 is illustrated that can be configured to operate in accordance with a preferred embodiment of the present invention. The system 10 is in the form of a network and consists of a central station (CS) 12 and one or more remote stations (RS's) 14. It should be noted that the system 10 represents a simple example of the type of communication system with which the concepts of the present invention can be employed, but other more complicated systems that employ more than one central station, for example, could be used as well. The CS 12 is the main controller of the system 10 in that the CS 12 manages all communications with the RS's 14. To provide this functionality, the CS 12 employs a computer based controller 16 and one or more radio frequency (RF) transceivers 18. The controller 16 can be implemented with any suitable processor, single board computer, personal computer, etc. and contains the software required for graphical user interface (GUI), data storage, data analysis, command and control and additional software required to monitor the RS's 14. The CS 12 initiates and maintains the polling sequence of the RS's 14 and displays the data retrieved via RF from the RS's 14 on a display 19. The RF transceiver 18 can be selected to fit a particular application or to comply with local regulations. For example, among the options for the RF communications are ultrahigh frequency (UHF) spread spectrum, Bluetooth, and IEEE 802.1 1.

The system 10 has the ability to perform like a web, providing the capability to share information among the RS's 14. Communication between the CS 12 and the RS's 14, as well as between the RS's 14 themselves is via a plurality of wireless links 20 as illustrated in FIG. 1. The system 10 can be centralized in which all communications go through the CS 12, or it can be decentralized as shown in FIG. 1 where each of the RS's 14 can communicate directly with each other.

Different approaches were investigated for the wireless communication links 20. The type of wireless link to select depends on the particular application and on constraints placed by the environment where the system is installed. For instance, the wireless links 20 will vary according to the KSC environments they need to work on (specifically related to the Space Shuttle program, Space Station program, Future Vehicles program). Electromagnetic Compatibility (EMC) emissions are also part of the constraints.

The CS 12 and each of the RS's 14 monitor the condition of the communication links 20 that facilitate communication between the CS 12 and the RS's 14. An RS 14 will be deemed a "lost station" if communication failures are detected. The communication failures can be temporary or permanent and could occur as a result of interference by other RF-emitting equipment, physical obstructions or faulty electronics. As will be discussed in greater detail in conjunction with FIGS. 4 and 5, the CS 12 and the RS 14 seek other communication paths to reestablish a good communication channel. If communication problems still persist, a faulty RS can be deactivated from the polling sequence.

Figure 3:
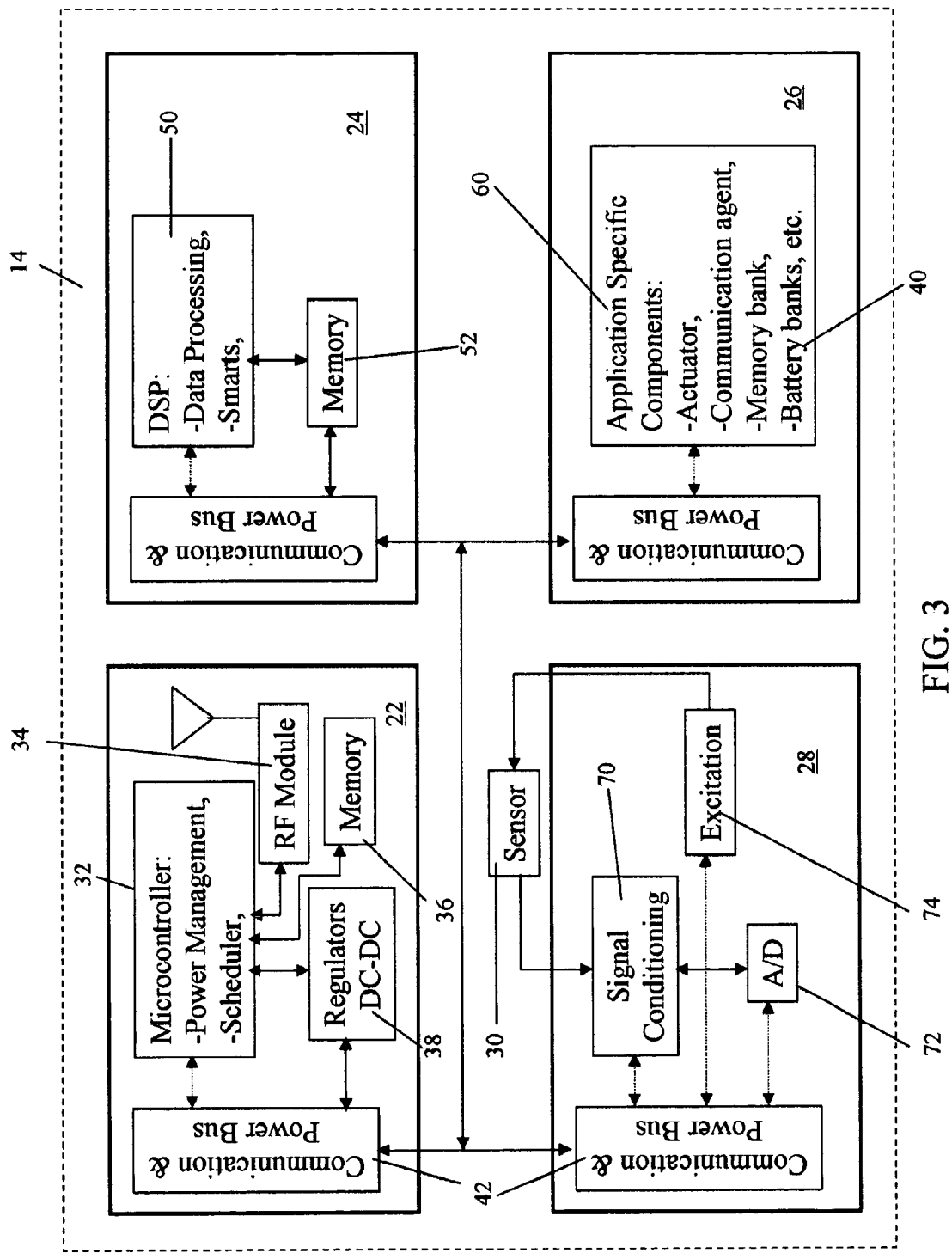
FIG. 3 is a block diagram of a remote communications station for the wireless system of FIG. 1.

The details of one of the RS's 14 are illustrated in FIG. 3. Each RS 14 is a modular device consisting of a number of modules- a core module 22, a smart module 24 and a custom module 26. In addition, a signal conditioning board 28 is employed that is specific to the characteristics of one or more sensors 30 to which the signal conditioning board 28 is connected. The main purposes of the RS 14 are to acquire data from the sensor (or sensors) 30, to command an actuator, to excite a sensor, or to acquire an entire process and transmit the data to the CS 12. The modular design of the RS 14 simplifies the installation for new measurements by requiring minimal hardware changes.

The core module 22 is the heart of the RS 14 and includes a microcontroller 32, an RF transceiver module 34, a memory 36 and one or more DC-DC power regulators 38. The microcontroller 32 controls communications with the CS 12 and the other RS's 14. Among other things, the microcontroller 32 performs RF health checks with the CS 12. In addition, the microcontroller 32 implements a power management and scheduling scheme in accordance with an algorithm to be discussed in detail in conjunction with FIGS. 6 and 7. In this manner, the power that is supplied to the various modules or components of the RS 14 from the regulators 38 is controlled to maximize efficient power usage from an exhaustible power supply 40, such as a battery, that forms part of the custom module 26. The RS 14 can be installed in existing systems utilizing available externally supplied power or self-contained battery power. A communication and power bus 42 connects the components of the core module 22 to the other modules 24 and 26 and to the signal conditioning board 28.

Preferably, the smart module 24 includes a digital signal processor (DSP) 50 and a memory 52 interfaced thereto for storing data received from the sensor 30 and generated by the DSP 50. However, it should be understood that any other form of processor can be used in place of the DSP 50. The DSP 50 together with the embedded software forms the "smarts" or intelligence of the RS 14 and is programmed as desired to process and analyze the data received from the sensor 30. Without the DSP 50, the RS's 14 can have some intelligence built into the software to perform real-time data analysis. However, the DSP 50 can perform more complicated functions. Analysis can include simple averaging of data, maximum and minimum detection, decimation, statistics, spectral analysis, digital filtering, trending, etc.

The custom module 26, as the name implies, includes application a number of specific components 60 that are custom tailored for the particular RS. These application specific components can include, for example, an actuator, communication agent and a memory bank. In addition, these can include the battery banks 40 that power the RS 14 and will differ from RS to RS, depending upon the power requirements of the particular sensor and functions employed by the RS 14.

To interface the analog voltage or current signal generated by the sensor 30 to the digital circuitry of the core and smart modules 22 and 24, the signal conditioning board 28 includes a number of conditioning components 70, such as amplifiers, filters, etc. These modify the analog output signal of the sensor 30 as necessary so that the signal can then be digitized by an A/D converter 72 and then sent through the communication bus 42 to the other components of the RS 14. The signal conditioning board 28 can also provide sensor excitation if required.

The manner in which the CS 12 communicates with and receives data from each of the RS's 14 will now be described. Each RS 14, as well as the CS 12, has a unique identifier, such as an address, that is used by the CS 12 and each of the RS's 14 for facilitating communications between the two. The digitized sensor output that is generated by the A/D converter 72 is included by the RS 14 in a message structure for RF transmission. Each RS 14 can also be instructed by the CS 12 to serve as a "relay station" for other RS's that are placed in a "lost station" condition. A relay station acts as a repeater, thus assisting in the relaying of the information sent to and from the remote "lost station." A chain of the relay stations can thus be created to relay information from sensors placed far apart from the CS 12. Each RS 14 may also serve as a node master station (NMS) that is responsible for monitoring several of the other RS's 14 and reporting its findings to the CS 12.

The present invention employs an algorithm that facilitates communications between two stations directly, as well as through indirect routes using stations as transponders or relays. In addition, the invention is designed to satisfy the requirement that communications remain fast with maximum reliability while a specified amount of data is being sent. In the preferred embodiment, each RS 14 is processor-based and is capable of sending and receiving data on primary and several alternate frequency pairs to enable continuous high-speed transmissions. This permits multiple communication paths for simultaneous operations without interference.

Also in the preferred embodiment, the CS 12 keeps track of all communication transactions. Under normal operations, the CS 12 queries each RS 14 in the system 10 using a first radio frequency. Each RS 14 replies in sequence on a second frequency until all of the RS's 14 are logged. All RS's 14 that communicate directly with the CS 12 are each designated as a primary remote station. If all stations reply as expected, the CS 12 will eventually cycle through each RS 14 and restart the process.

Mainly because of their low RF power properties, distant stations or those located in signal-poor areas where the communications drop rate is too high may become identified as "lost stations" if the signal between them and the CS 12 becomes lost. In the preferred embodiment, should a primary one of the RS's 14 fail to communicate with the CS 12 on two consecutive polls, the RS 14 will be flagged as a lost remote by the CS 12. At the same time, the microcontroller 32 in the lost one of the RS's 14 will detect that a communication failure has occurred through expiration of a lost station timer that keeps track of how much time has passed since a polling command has been received from the CS 12. If the timer expires, the microcontroller 32 switches transmit and receive radio frequencies for that RS 14 to a third frequency for receiving and a fourth frequency for transmitting a reply for reasons to be discussed next.

Figure 4:
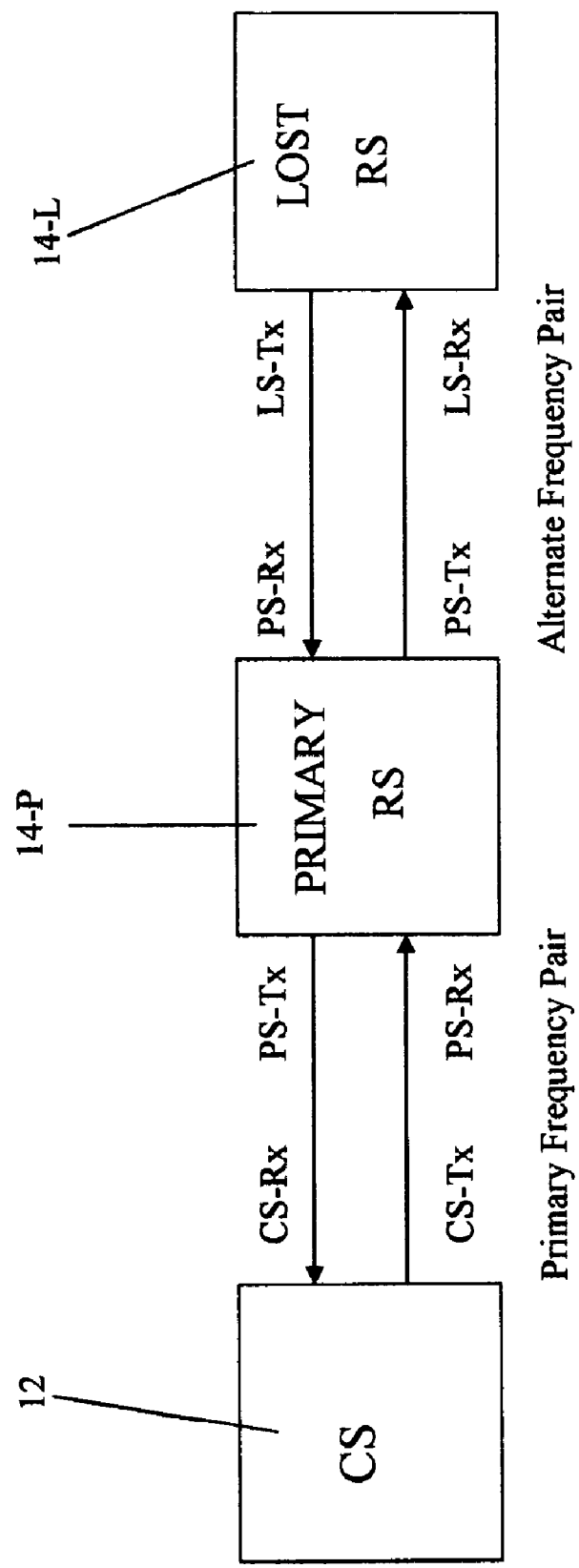
FIG. 4 is a block diagram illustrating the steps implemented for establishing communications between the central station and a lost remote station via relaying through a primary remote station.

Having identified which of the RS's 14 is lost, the CS 12 will then begin an operation to find a primary one of the RS's 14 that has the ability to communicate with the identified lost station. The step-by-step process carried out is illustrated in FIG. 4 and TABLE 1. It begins by incrementing the lost station count from 0 to 1. On the next successive poll, the CS 12 transmits data to all primary RS's to identify the station that is lost and commands the first primary RS 14-P in the poll sequence to retransmit a query to the lost station (LS) 14-L, in effect becoming a relay station to the CS 12 for the LS 14-L. That primary RS 14-P then transmits a poll signal on an alternate frequency pair and waits for a response. If the LS 14-L communicates on that alternate frequency pair, the primary RS 14-P then stores the data and switches to the primary frequency pair until the CS 12 polls it again. At this point, the primary RS 14-P reports on the primary frequency pair with its own data, as well as that of the LS 14-L. With this response, the CS 12 notes the successful communications loop and designates that primary RS 14-P as the relay station for all future communications with that particular lost station LS 14-L until the CS 12 successfully establishes a direct communication path with the LS 14-L. The polling routine then continues normally for all regularly reporting RS's except these two RS's until a refresh poll is initiated by the CS 12.

As an extension to this scenario, if the LS 14-L does not reply to the designated primary RS 14-P, then the CS 12 will duly note this and go to the next primary RS in the poll sequence, requesting it to perform the same operations until one of the primary stations eventually acknowledges communications with the LS 14-L. If none of the primary RS's achieve contact, then the LS 14-L will be flagged as defective and dropped from the poll events until either an automated or manual reset is initiated. When activated, this reset will restart the communications routine and the CS 12 attempts to reestablish direct communications with each RS 14 in the system as a primary RS.

TABLE 1

| Step | Data Transmitted or Received |
|---|---|
| 1) CS Transmits: | Primary Remote Address |
| | "1" for Lost Remotes Count |
| | Primary Remote Commands |
| | Its Own Address for Reply |
| | Secondary Remote Address |
| | Secondary Remote Commands |

TABLE 1-continued

| Step | Data Transmitted or Received |
|---|---|
| 2) PR Receives: | Its Own Address |
| | "1" for Lost Remote Count |
| | Its Own Commands |
| | Central Station Address for Reply |
| | Lost Remote Address |
| | Lost Remote Commands |
| 3) PR Transmits: | Lost Remote Address |
| | "0" Lost Remote Count |
| | Lost Remote Commands |
| | It's Own Address for Reply |
| 4) LR Receives: | Its Own Address |
| | "0" Lost Remote Count |
| | Its Own Commands |
| | Primary Remote Address for Reply |
| 5) LR Transmits: | Primary Remote Address |
| | "0" for Lost Remote Count |
| | Its Own Address for ID |
| | Its Own Data |
| 6) PR Receives: | Its Own Remote Address |
| | "0" for Lost Remote Count |
| | Lost Remote Address |
| | Lost Remote Data |
| 7) PR Transmits: | Central Station Address |
| | "1" Lost Remote Count |
| | Its Own Address for ID |
| | Its Own Data |
| | Last Remote Address |
| | Lost Remote Data |
| 8) CS Receives: | Its Own Address |
| | "1" Lost Remote Count |
| | Primary Remote Address |
| | Primary Remote Data |
| | Lost Remote Address |
| | Lost Remote Data |
| | Flags this Primary Remote to be Repeater for this Lost Remote on Future Polls |

Figure 5:
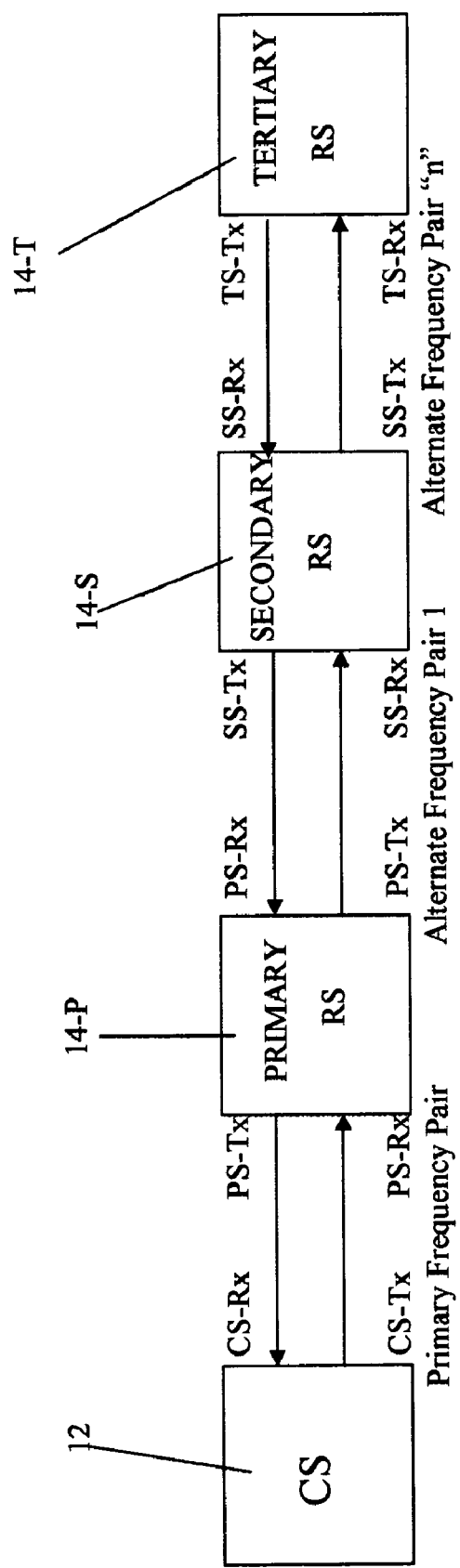
FIG. 5 is a block diagram illustrating the steps implemented for establishing communications between the central station and a tertiary remote station via relaying through a primary remote station and a secondary remote station.

To extend the distance capability, it can be possible to place a tertiary station (TS) at a distance far enough away from the CS 12 and the primary RS's 14 that it would have to rely on a secondary station as its only source of communications with the system. Such system layouts may be necessary, by design, rather than incidental due to malfunction. The operation sequences mimic that of a normal lost station routine but differ in that the level reaches one step further and utilizes another alternate frequency pair to transmit and receive. This procedure, which involves relaying information from the CS 12 through a primary RS 14-P and a secondary RS 14-S to a tertiary RS 14-T and then back, is illustrated in FIG. 5 and TABLE 2. The CS 12 begins such an operation by informing the primary RS 14-P that there are 2 lost stations. The primary RS 14-P tells the secondary RS 14-S that there is 1 lost station, and the secondary RS 14-S then acts like a primary RS by sending a zero-lost-station count and command string to the tertiary RS 14-T.

TABLE 2

| Step | Data Transmitted or Received |
|---|---|
| 1) CS Transmits: | Primary Remote Address |
| | "2" for Lost Remotes Count |
| | Primary Remote Commands |
| | Central Station Address for Reply |
| | Secondary Remote Address |
| | Secondary Remote Commands |
| | Tertiary Remote Address |
| | Tertiary Remote Commands |

TABLE 2-continued

| Step | Data Transmitted or Received |
|---|---|
| 2) PR Receives: | Its Address |
| | "2" for Lost Remote Count |
| | Its Own Commands |
| | Central Remote Address for Reply |
| | Secondary Remote Address |
| | Secondary Remote Commands |
| | Tertiary Remote Address |
| | Tertiary Remote Commands |
| 3) PR Transmits: | Secondary Remote Address |
| | "1" for Lost Remote Count |
| | Secondary Remote Commands |
| | Its Own Address for Reply |
| | Tertiary Remote Address |
| | Tertiary Remote Commands |
| 4) SR Receives: | Its Own Address |
| | "1" for Lost Remote Count |
| | Its Own Commands |
| | Primary Remote Address for Reply |
| | Tertiary Remote Address |
| | Tertiary Remote Address |
| 5) SR Transmits: | Address for Tertiary Remote |
| | "0" for Lost Remote Count |
| | Commands for Tertiary Remote |
| | Its Own Address for Reply |
| 6) TR Receives: | Its Own Address |
| | "0" For Lost Remote Count |
| | Its Own Commands |
| | Secondary Remote Address for Reply |
| 7) TR Transmits: | Secondary Remote Address |
| | "0" For Lost Remote Count |
| | Its Own Address for ID |
| | Its Own Data |
| 8) SR Receives: | Its Own Address |
| | "0" for Lost Remote Count |
| | Tertiary Remote Address |
| | Tertiary Remote Data |
| 9) SR Transmits: | Primary Remote Address |
| | "1" Lost Remote Count |
| | Its Own Address for ID |
| | Its Own Data |
| | Tertiary Remote Address |
| | Tertiary Remote Data |
| 10) PR Receives: | Its Own Address |
| | "1" for Lost Remote Count |
| | Secondary Remote Address |
| | Secondary Remote Data |
| | Tertiary Remote Address |
| | Tertiary Remote Data |
| 11) PR Transmits: | Central Station Address |
| | "2" for Lost Remote Count |
| | Its Own Address for ID |
| | Its Own Data |
| | Secondary Remote Address |
| | Secondary Remote Data |
| | Tertiary Remote Address |
| | Tertiary Remote Data |
| 12) CS Receives: | Its Own Address |
| | "2" for Lost Remote Count |
| | Primary Remote Address |
| | Primary Remote Data |
| | Secondary Remote Address |
| | Secondary Remote Data |
| | Tertiary Remote Address |
| | Tertiary Remote Data |
| | Flags this Primary Remote to be Repeater for |
| | these Secondary and Tertiary Remotes on Future Polls |

Once the determination is made that a particular primary RS can communicate with a secondary RS, the CS 12 assigns that primary RS as a repeater station for the specific secondary RS until a refresh poll is sent. Polling for a secondary RS starts after two missed poll attempts to that station as a primary RS (first skipping attempts through primary RS's that have already been assigned as repeaters).

If more than two tertiary RS's exist, the CS 12 will stack the addresses of the stations and rotate the order of the stations to be contacted to ensure each possible sequence is attempted. For example, assume CS 12 has two tertiary RS's that are not communicating. The CS 12 will direct the secondary RS to communicate with the first tertiary station first. If there is no response, then the CS 12 will direct the secondary RS to try to communicate with the second tertiary station. Ultimately, the desire is to minimize the RS's use as repeaters as much as possible.

It should be noted that the system 10 can also be configured such that both the CS 12 and each of the RS's 14 can communicate with one another using any of a plurality of transmit/receive frequency pairs to avoid problems with frequency jamming, etc. For example, if a primary one of the RS's 14 attempts but fails to communicate as a relay station with a lost station, the relay station can then switch to another pair of alternate transmit/receive frequencies and repeat this process for all frequency pairs until even the original pair of frequencies may once again be tried. Thus, if the lost station fails to receive communications on a first alternate frequency pair within a given period of time, it can sequence through each additional frequency pair until either a frequency pair is found on which communications are received or the lost station terminates further communication attempts.

Figure 6:
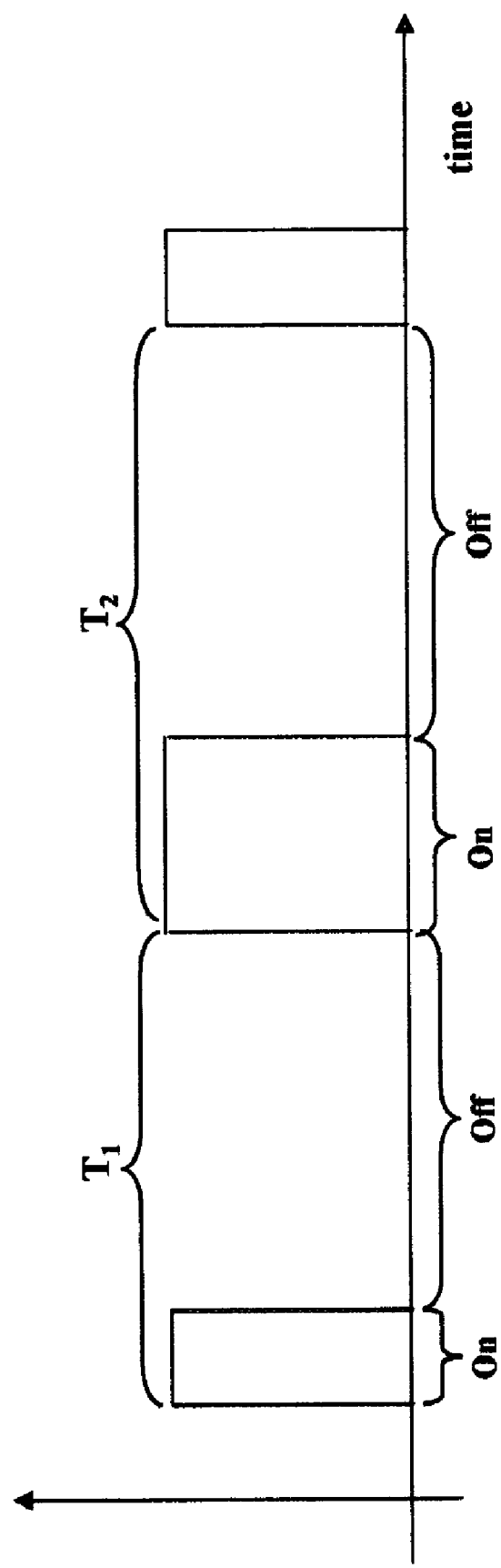
FIG. 6 is a time graph showing a power duty cycle implemented by a power management algorithm in each remote station.

As mentioned previously, the power management algorithm in the microcontroller 32 in the RS 14 is responsible to power up and down the other boards in the RS 14 and any other circuitry associated with it. An adjustable duty cycle in the power management algorithm provides the on and off periods as illustrated in FIG. 6 such that the on periods adjust in length depending upon whether the RS 14 is receiving, transmitting or processing information, while the off periods remain relatively constant. As a result, the total cycle T2 shown in FIG. 6 is longer than the cycle T1. The duty cycle information is stored in the microcontroller memory and can be adjusted based on the required sampling or control rate. The CS 12 can also adjust the duty cycle information of the RS's 14 to allow for faster or slower communications (higher and lower power consumption, respectively).

Figure 7:
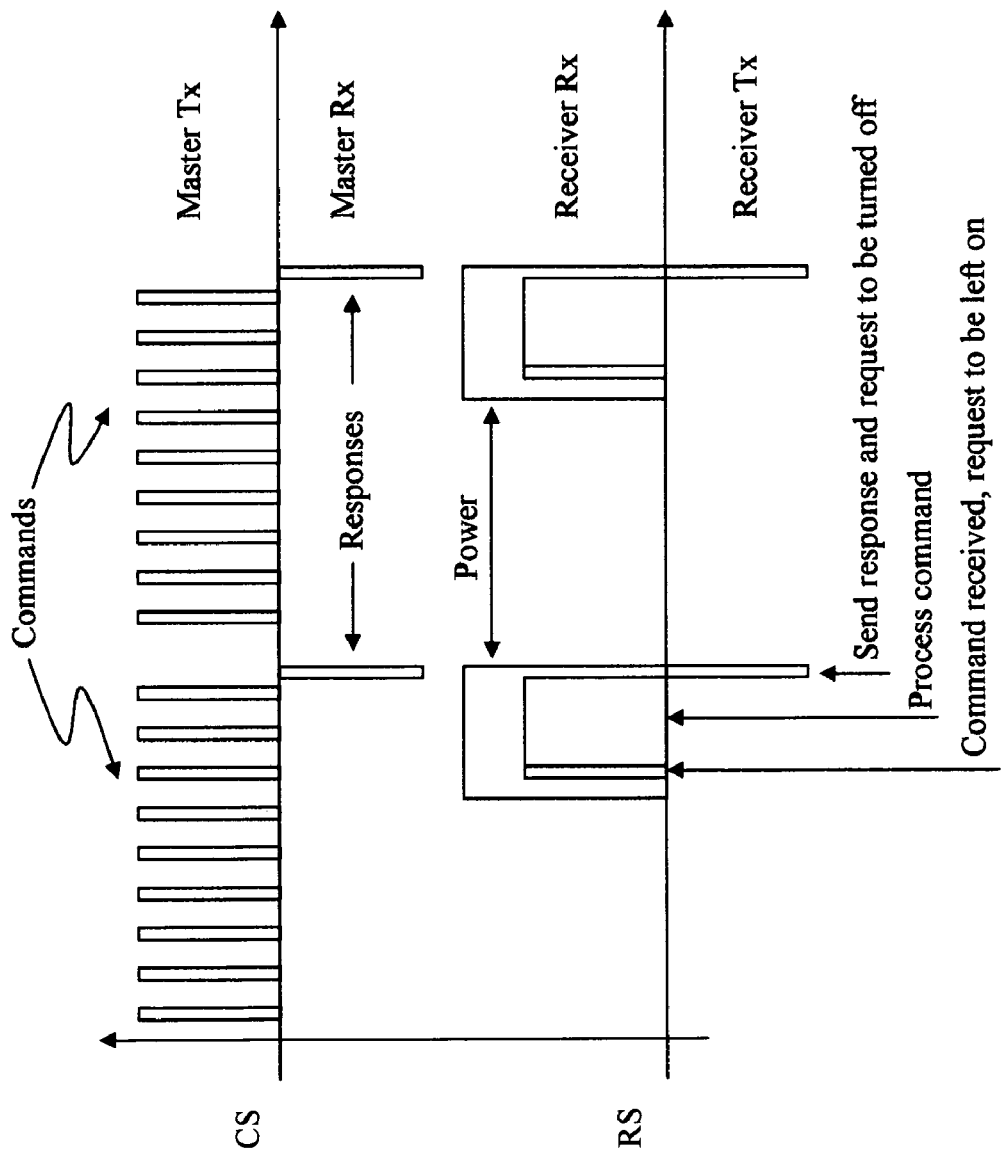
FIG. 7 is a time graph showing the power scheme applied to the remote station in response to commands received from the central station.

During operation of the system 10, when the CS 12 requires information, a command is sent to the RS's 14 continuously as illustrated in FIG. 7, until a response is received from the RS 14 or the command times out. The RS 14 will not receive the command while it is in low power mode, but will receive the command as soon as it powers up during the power on period of the cycle. Upon reception of the command, the power management algorithm instructs the microcontroller 32 to maintain power to the RS 14's components while it executes the received command. Once the command is executed and the response is sent back to the CS 12, the power management algorithm causes the microcontroller 32 to power down the RS 14 until the next on cycle.

It should be noted that other auxiliary boards in the RS 14 could be powered up and down depending on the type of request sent by the CS 12. Also, the duty cycle can be adjusted to achieve fast response times and reliable communication. Further, the power management parameters can be changed in real time to decrease response time and maximize communication bandwidth whenever needed.

Although the invention has been disclosed in terms of a preferred embodiment and variations thereon, it will be understood that numerous additional variations and modifications could be made thereto without departing from the scope of the invention as set forth in the following claims.

What is claimed is:

1. A method for communicating between at least a first wireless central station and a plurality of wireless remote stations in a wireless instrumentation system comprising the steps of:
   transmitting information from said central station to said remote stations through a plurality of wireless links;
   determining from said central station whether one or more of said remote stations has become a lost station due to a communication failure between said central station and said lost station;
   in response to determining that a remote station has become a lost station, identifying from said central station at least one of said remote stations that can act as a relay station that can relay information from said central station to said lost station or to another of said remote stations that can also act as a relay station; and
   transmitting information between said central station and said lost station via said one or more relay stations.

2. The method of claim 1, wherein said step of determining whether one or more of said remote stations has become a lost station comprises:
   transmitting one or more polling signals from said central station to said remote stations; and
   identifying one or more of said remote stations from which a reply to said polling signal has not been received by said central station as a lost station.

3. The method of claim 2, wherein the step of identifying at least one of said remote stations that can act as a relay station comprises:
   1) transmitting from said central station to a first one of said remote stations from which a reply to said one or more polling signals was received, information for said lost station;
   2) if a reply is received by from said first one of said remote stations by said central station confirming that said information was successfully relayed to said lost station, then sending future information for said lost station to said first one of said remote stations as a relay station for said lost station; and
   3) if a reply is not received by from said first one of said remote stations by said central station confirming that said information was successfully relayed to said lost station, then repeating steps 1 and 2 for additional ones of said remote stations from which a reply to said one or more polling signals was received by said central station.

4. The method of claim 3, wherein said central station communicates with said remote stations using a first communication transmit/receive frequency pair and said relay station communicates with said lost station or another one of said remote stations using a second transmit/receive communication frequency pair.

5. The method of claim 4, wherein if any of said remote stations does not receive a polling signal from said central station within a predetermined period of time and is thus determined to be a lost station, said lost station will switch its transceiver to communicate information using said second transmit/receive communication frequency pair so that said lost station can communicate using said second transmit/receive communication frequency pair with one of said remote stations that is attempting to act as a relay station for said lost station.

6. The method of claim 5, wherein If said lost station does not receive a polling signal from said central station within a predetermined period of time using the second transmit/receive communication frequency pair, said lost station will switch its transceiver to a third transmit/receive communication frequency pair so that said lost station can receive information sent using said third transmit/receive communication frequency pair from one of said remote stations that is attempting to act as a relay station for said lost station.

7. The method of claim 1, wherein if at least two of said remote stations are identified as lost stations, then said steps of identifying and transmitting comprise:
   identifying at least one of said remote stations that can act as a first relay station and communicate both with said central station and a first of said lost stations, said first lost station being selected as one that can act as a second relay station that can communicate both with a second of said lost stations and said first relay station; and
   transmitting information between said central station and said second lost station using said first and second relay stations.

8. The method of claim 7, wherein the step of transmitting employs a first transmit/receive communication frequency pair between said central station and said first relay station, a second transmit/receive communication frequency pair between said first relay station and said first lost station, and a third transmit/receive communication frequency pair between said first lost station and said second lost station.

9. The method of claim 1, wherein each of said remote stations is associated with a measurement sensor and can send sensor measurement data back to said central station.

10. The method of claim 9, wherein said remote stations each include a processor for analyzing measurement data generated by said sensor.

11. The method of claim 9, wherein each of said remote stations is modular in construction and includes a power module, a transceiver module and a custom module, said custom module being selected in accordance with a particular sensor associated with the remote station.

12. The method of claim 1, wherein one or more of said remote stations includes a controller that operates said remote station in first and second alternating power modes, said modes including a low power mode during which said remote station transceiver is not operating and a power up mode during which said transceiver is operating, said controller being programmed to control said power modes such that said remote station is operated in a repeating cycle of said low power mode for a first selected period of time followed by said power up mode for a second selected period of time as long as no information is being received from said central station, but if during said power up mode, said controller detects that information is being received from said central station, said controller maintains said remote station in said power up mode until said remote station transceiver has received said information, said controller has processed said information and said transceiver has sent a reply back to said central station, after which said controller switches said remote station back to said low power mode for said first selected period of time.

13. The method of claim 12, wherein said first and second selected time periods are adjustable either by said controller in said remote station or by a controller in said central station.

14. The method of claim 12, wherein at least one of said remote stations includes modules that can be selectively operated by said controller during said low power mode and said power up mode.

15. The method of claim 12, wherein said central station is programmed to send information to each of said remote stations repeatedly until said remote stations acknowledge receipt of said information.

16. The method of claim 1 comprising the further step of: operating one or more of said remote stations in first and second alternating power modes, said modes including a low power mode during which a remote station transceiver is not operating and a power up mode during which said transceiver is operating, a controller being programmed to control said power modes such that said remote station is operated in a repeating cycle of said low power mode for a first selected period of time followed by said power up mode for a second selected period of time as long as no information is being received from said central station, but if during said power up mode, said controller detects that information is being received from said central station, said controller maintains said remote station in said power up mode until said remote station transceiver has received said information, said controller has processed said information and said transceiver has sent a reply back to said central station, after which said controller switches said remote station back to said low power mode for said first selected period of time.

17. The method of claim 16, wherein said first and second selected time periods are adjustable either by said controller in said remote station or by a controller in said central station.

18. The method of claim 16, wherein at least one of said remote stations includes modules that can be selectively operated by said controller during said low power mode and said power up mode.

19. The method of claim 16, wherein said central station is programmed to send information to each of said remote stations repeatedly until said remote stations acknowledge receipt of said information.

20. The method of claim 16, wherein each of said remote stations is associated with a measurement sensor and can send sensor measurement data back to said central station.

21. The method of claim 20, wherein at least one of said remote stations includes a processor for analyzing measurement data generated by said sensor.

22. The method of claim 16, wherein each of said remote stations is modular in construction and includes a power module, a transceiver module and a custom module, said custom module being selected in accordance with a particular sensor associated with the remote station.

23. The method of claim 22, wherein said controller is programmed to selectively power up any of said modules, depending upon information received from said central station.

24. A wireless instrumentation system comprising:
at least one central station including an RF transceiver and a controller; and
a plurality of remote stations for transmitting communications to and receiving communications from said central station, each said remote station including an RF transceiver and a controller;
wherein, said central station controller is programmed to:
determine whether any of said remote stations has become a lost station due to a communication failure between said central station and said lost station;
identify, in response to determining that a remote station has become a lost station, at least one of said remote stations that can act as a relay station that can relay information from said central station to said lost station or to another of said remote stations that can also act as a relay station; and
transmit information between said central station and said lost station via said one or more relay stations.

25. The system of claim 24, wherein said central station controller determines whether any of said remote stations has become a lost station by carrying out the steps of:
transmitting one or more polling signals from said central station to said remote stations; and
identifying one or more of said remote stations from which a reply to said polling signal has not been received by said central station as a lost station.

26. The system of claim 25, wherein said central station controller is programmed to identify at least one of said remote stations that can act as a relay station by carrying out the steps of:
1) transmitting from said central station to a first one of said remote stations from which a reply to said one or more polling signals was received, information for said lost station;
2) if a reply is received by from said first one of said remote stations by said central station confirming that said information was successfully relayed to said lost station, then sending future information for said lost station to said first one of said remote stations as a relay station for said lost station; and
3) if a reply is not received by from said first one of said remote stations by said central station confirming that said information was successfully relayed to said lost station, then repeating steps 1 and 2 for additional ones of said remote stations from which a reply to said one or more polling signals was received by said central station.

27. The system of claim 26, wherein said central station communicates with said remote stations using a first communication transmit/receive frequency pair and said relay station communicates with said lost station or another one of said remote stations using a second transmit/receive communication frequency pair.

28. The system of claim 26, wherein if any of said remote stations does not receive a polling signal from said central station within a predetermined period of time and is thus determined to be a lost station, said lost station will switch its transceiver to communicate information using said second transmit/receive communication frequency pair so that said lost station can communicate using said second transmit/receive communication frequency pair with one of said remote stations that is attempting to act as a relay station for said lost station.

29. The system of claim 28, wherein said lost station does not receive a polling signal from said central station within a predetermined period of time using the second transmit/receive communication frequency pair, said lost station will switch its transceiver to a third transmit/receive communication frequency pair so that said lost station can receive information sent using said third transmit/receive communication frequency pair from one of said remote stations that is attempting to act as a relay station for said lost station.

30. The system of claim 24, wherein if at least two of said remote stations are identified as lost stations, then said steps of identifying and transmitting comprise:
identifying at least one of said remote stations that can act as a first relay station and communicate both with said central station and a first of said lost stations, said first lost station being selected as one that can act as a second relay station that can communicate both with a second of said lost stations and said first relay station; and transmitting information between said central station and said second lost station using said first and second relay stations.

31. The system of claim 30, wherein the step of transmitting employs a first transmit/receive communication frequency pair between said central station and said first relay station, a second transmit/receive communication frequency pair between said first relay station and said first lost station, and a third transmit/receive communication frequency pair between said first lost station and said second lost station.

32. The system of claim 24, wherein each of said remote stations is associated with a measurement sensor and can send sensor measurement data back to said central station.

33. The system of claim 32, wherein said remote stations include a processor for analyzing measurement data generated by said sensor.

34. The system of claim 32, wherein each of said remote stations is modular in construction and includes a power module, a transceiver module and a custom module, said custom module being selected in accordance with a particular sensor associated with the remote station.

35. The system of claim 24, wherein one or more of said remote station controllers operates said remote station in first and second alternating power modes, said modes including a low power mode during which said remote station transceiver is not operating and a power up mode during which said transceiver is operating, said controller being programmed to control said power modes such that said remote station is operated in a repeating cycle of said low power mode for a first selected period of time followed by said power up mode for a second selected period of time as long as no information is being received from said central station, but if during said power up mode, said controller detects that information is being received from said central station, said controller maintains said remote station in said power up mode until said remote station transceiver has received said information, said controller has processed said information and said transceiver has sent a reply back to said central station, after which said controller switches said remote station back to said low power mode for said first selected period of time.

36. The system of claim 35, wherein said first and second selected time periods are adjustable either by said controller in said remote station or by said controller in said central station.

37. The system of claim 35, wherein at least one of said remote stations includes modules that can be selectively operated by said controller during said low power mode and said power up mode.

38. The system of claim 35, wherein said central station controller is programmed to send information to each of said remote stations repeatedly until said remote stations acknowledge receipt of said information.

39. The system of claim 24 wherein:

each of said remote station controllers is programmed to operate said remote station in first and second alternating power modes, said modes including a low power mode during which said remote station transceiver is not operating and a power up mode during which said transceiver is operating, said controller being programmed to control said power modes such that said remote station is operated in a repeating cycle of said low power mode for a first selected period of time followed by said power up mode for a second selected period of time as long as no information is being received from said central station, but if during said power up mode, said controller detects that information is being received from said central station, said controller maintains said remote station in said power up mode until said remote station transceiver has received said information, said controller has processed said information and said transceiver has sent a reply back to said central station, after which said controller switches said remote station back to said low power mode for said first selected period of time.

40. The system of claim 39, wherein said first and second selected time periods are adjustable either by said controller in said remote station or by said controller in said central station.

41. The system of claim 39, wherein at least one of said remote stations includes modules that can be selectively operated by said controller during said low power mode and said power up mode.

42. The system of claim 39, wherein said central station controller is programmed to send information to each of said remote stations repeatedly until said remote stations acknowledge receipt of said information.

43. The system of claim 39, wherein each of said remote stations is associated with a measurement sensor and can send sensor measurement data back to said central station.

44. The system of claim 43, wherein at least one of said remote stations includes a processor for analyzing measurement data generated by said sensor.

45. The system of claim 39, wherein each of said remote stations is modular in construction and includes a power module, a transceiver module and a custom module, said custom module being selected in accordance with a particular sensor associated with the remote station.

46. The system of claim 45, wherein said controller is programmed to selectively power up any of said modules, depending upon information received from said central station.

* * * * *